United States Patent
Koch et al.

(10) Patent No.: US 10,137,935 B2
(45) Date of Patent: Nov. 27, 2018

(54) SUPPORT FOR A MOTOR VEHICLE BODY-IN-WHITE

(71) Applicant: Bayerische Motoren Werke Aktiengesellschaft, Munich (DE)

(72) Inventors: Andre Koch, Munich (DE); Stefan Mieslinger, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 30 days.

(21) Appl. No.: 15/279,596

(22) Filed: Sep. 29, 2016

(65) Prior Publication Data

US 2017/0015361 A1 Jan. 19, 2017

Related U.S. Application Data

(63) Continuation of application No. PCT/EP2015/054706, filed on Mar. 6, 2015.

(30) Foreign Application Priority Data

Mar. 31, 2014 (DE) .................. 10 2014 206 002

(51) Int. Cl.
*B62D 21/15* (2006.01)
*B62D 29/04* (2006.01)
*B62D 29/00* (2006.01)
*B62D 25/02* (2006.01)

(52) U.S. Cl.
CPC ......... *B62D 21/157* (2013.01); *B62D 25/025* (2013.01); *B62D 29/008* (2013.01); *B62D 29/043* (2013.01)

(58) Field of Classification Search
CPC .. B62D 21/157; B62D 25/025; B62D 29/043; B62D 29/008
See application file for complete search history.

(56) References Cited

U.S. PATENT DOCUMENTS 5,059,056 A * 10/1991 Banthia .............. A47B 47/0008
296/203.01
6,193,306 B1 2/2001 Lee
2005/0121926 A1 6/2005 Montanvert et al.

FOREIGN PATENT DOCUMENTS

| CN | 101511665 A | 6/2009 |
|---|---|---|
| DE | 195 38 844 C2 | 2/1998 |
| DE | 102 24 884 A1 | 12/2003 |
| DE | 102 48 845 A1 | 4/2004 |

(Continued)

OTHER PUBLICATIONS

Chinese-language Office Action issued in counterpart Chinese Application No. 201580016544.X dated Jun. 1, 2017 with English translation (13 pages).

(Continued)

*Primary Examiner* — D Glenn Dayoan
*Assistant Examiner* — Melissa A Black
(74) *Attorney, Agent, or Firm* — Crowell & Moring LLP (57) ABSTRACT

A support for a motor vehicle body-in-white includes a straight longitudinal portion that includes at least one cavity which is delimited by walls of the support and inside of which a reinforcing element is accommodated and is fastened in the longitudinal direction of the support. The reinforcing element is force-locked to the support so as to be fastened in the longitudinal direction of the support.

14 Claims, 6 Drawing Sheets

(56) References Cited

FOREIGN PATENT DOCUMENTS

| | | |
|---|---|---|
| DE | 10 2005 041 894 A1 | 5/2007 |
| DE | 10 2009 044 417 A1 | 5/2011 |
| DE | 10 2010 030 535 A1 | 11/2011 |
| EP | 2 213 550 A1 | 8/2010 |
| JP | 5-270447 A | 10/1993 |

OTHER PUBLICATIONS

International Search Report (PCT/ISA/210) issued in PCT Application No. PCT/EP2015/054706 dated May 19, 2015, with English translation (four (4) pages).
German Office Action issued in counterpart German Application No. 10 2014 206 002.8 dated Dec. 3, 2014 (four (4) pages).

* cited by examiner

SUPPORT FOR A MOTOR VEHICLE BODY-IN-WHITE

CROSS REFERENCE TO RELATED APPLICATIONS

This application is a continuation of PCT International Application No. PCT/EP2015/054706, filed Mar. 6, 2015, which claims priority under 35 U.S.C. § 119 from German Patent Application No. 10 2014 206 002.8, filed Mar. 31, 2014, the entire disclosures of which are herein expressly incorporated by reference.

BACKGROUND AND SUMMARY OF THE INVENTION

The invention relates to a support for a motor vehicle body-in-white, in particular a side sill for a motor vehicle body.

A support of this kind designed as a side sill is already known, for example from JP 5270447 A. There, a reinforcing element is received with form-fit engagement in a cavity, which is delimited by respective support walls, of a straight longitudinal area of the support. The reinforcing element reinforces the side sill, for example in order to avoid excessive deformation in the event of a side impact. In order to avoid a movement of the reinforcing element in the longitudinal direction of the support, such reinforcing elements are usually connected to the respective support walls of the support by a respective joining connection, for example an adhesively bonded connection or a welded connection.

The object of the present invention is to make available a support which is of the kind mentioned at the outset and which is fastened in a simpler and improved way inside the associated cavity.

This and other objects are achieved, according to the invention, by a support for a motor vehicle body-in-white, with a straight longitudinal portion having at least one cavity which is delimited by respective support walls and in which a reinforcing element is received and is fastened in the longitudinal direction of the support. The reinforcing element is connected to the support with force-fit engagement so as to be fastened in the longitudinal direction of the support.

In order to make available a support of the kind mentioned at the outset, in which the reinforcing element is fastened in the correct position in the longitudinal direction of the support in a particularly simple and reliable manner, provision is made, according to the invention, that the reinforcing element is connected to the support or to the respective support walls with force-fit engagement so as to secure the position of the reinforcing element in the longitudinal direction of the support. In this way, it is possible, in particular, to dispense with a corresponding joint or other type of connection between the support walls of the support and the reinforcing element. This not only permits a particularly simple and cost-effective production of the support with the integrated reinforcing element overall, but also ensures extremely reliable fastening of the reinforcing element in the longitudinal direction of the support during the lifetime of the motor vehicle. Moreover, compared to a welding method for fastening the reinforcing element for example, it is possible to avoid an input of heat into the structural parts involved and, consequently, an undesired change of the joint and resulting misalignment of the structural parts.

The force-fit engagement between the reinforcing element and the respective support walls of the cavity can easily be achieved by suitably heating or cooling the structural parts involved, i.e. the support and the reinforcing element, or, for example, also by pressing the reinforcing element into the cavity. If appropriate, provision can also be made for gentle conical tapering in particular of the reinforcing element, but also of the cavity, so as to achieve the corresponding force-fit connection of the structural parts involved during the pressing-in of the reinforcing element. In the force-fit connection, the two structural parts can be elastically or elasto-plastically deformed. In particular, it is contemplated, for example, that the cavities, or the corresponding support walls which delimit the cavities, widen and/or deform slightly elastically or elasto-plastically on account of a slight overdimension of the reinforcing element. This slight elasticity of the extruded profile then holds the corresponding reinforcing element securely in its intended position inside the cavity, even without additional measures.

In a further embodiment of the invention, it has proven advantageous if the support is designed as an extruded profile at least in the straight longitudinal area in which the reinforcing element is intended to be arranged. It is not only possible for an extruded profile of this kind to be produced very easily and cost-effectively, it also easily provides a cavity of continuous cross section in which a reinforcing element can be fastened with force-fit engagement particularly expediently.

The above-described integration of the reinforcing element in the support is particularly suitable for use in a respective side sill of a motor vehicle. Such side sills have to be reinforced or stiffened in the longitudinal direction of the vehicle, for example in order to have sufficient stability when subjected to corresponding forces resulting from an accident, for example a frontal collision with a small lateral overlap (offset crash), and in order not to buckle. Similarly, side sills of this kind also need to have corresponding stability in the transverse direction of the vehicle, for example in order not to undergo excessive deformation in the event of a side impact, which would cause considerable intrusion into the passenger space of the motor vehicle.

In another advantageous embodiment, provision is made that respective supporting elements, on which the reinforcing element is supported with force-fit engagement, protrude from the support walls. Supporting elements of this kind make it possible, in a particularly simple manner, to provide a form-fit connection in the transverse direction or height direction of the support and a force-fit connection in the longitudinal direction of the support.

In a further embodiment of the invention, it has proven advantageous if the reinforcing element is designed as a reinforcing tube. A reinforcing tube of this kind is itself relatively easy to produce and can be subjected to considerable forces in particular in the longitudinal direction, but also in the transverse direction. In this connection, it has moreover proven advantageous if the supporting elements of the support for receiving and supporting the reinforcing tube are designed as plane supporting walls, which extend in the direction of a central axis of the reinforcing tube. This results in a force-fit connection, between reinforcing tube and support, that is particularly uniform in terms of forces.

Alternatively to a reinforcing tube, it is also contemplated that the reinforcing element is designed as a reinforcing structure, in particular as a honeycomb structure. Such a honeycomb structure is suitable in particular for absorbing energy from forces acting in the transverse direction of the support, of the kind that arise in particular when a side sill is exposed to a side impact.

In a further embodiment of the invention, it is for this reason also advantageous if the respective cavities of the reinforcing structure extend in the transverse direction of the support. In this way, it is possible to achieve a correspondingly high degree of energy absorption, for example in the event of a side sill being exposed to a side impact.

Finally, it has proven advantageous if respective guide elements for pushing the reinforcing element in the longitudinal direction of the support into the cavity are provided on the support walls of the support, which guide elements cooperate with corresponding guide elements of the reinforcing element. In this way, the reinforcing element for generating the force-fit connection can be brought particularly accurately and with minimal tolerances to the desired location inside the cavity of the support.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
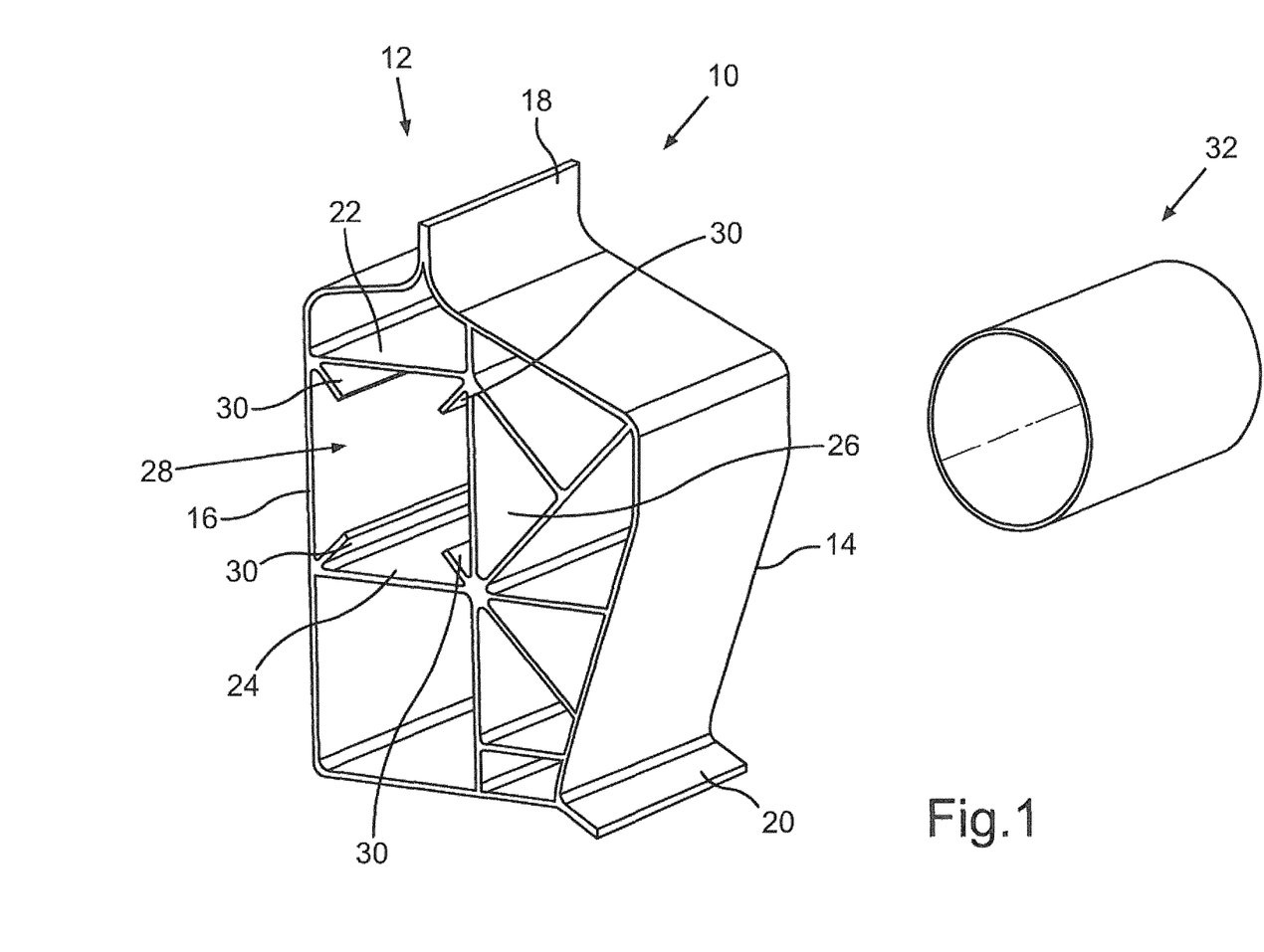
FIG. 1 is a perspective and schematic exploded view of a straight longitudinal area (shown in cross section) of a support for a motor vehicle body-in-white in the form of a side sill which has a plurality of cavities delimited by respective support walls, wherein a separately depicted reinforcing element in the form of a reinforcing tube can be introduced into one of the cavities and can be fastened in the longitudinal direction of the support, by way of the reinforcing element being able to be connected to the support with force-fit engagement.

The exploded view according to FIG. 1 shows in detail and in perspective on the left a detail of a longitudinal portion 10 of a support for a motor vehicle body-in-white in the form of a side sill 12 of a motor vehicle body. In the present case, the side sill 12 is designed as an extruded profile at least in the straight longitudinal portion 10. The material for this extruded profile can be in particular a lightweight metal alloy such as an aluminum alloy or else a plastic, in particular reinforced with fibers. The side sill 12 in this case includes an outer support wall 14 and an inner support wall 16 which extend between respective flanges, namely an upper flange 18 and an inner flange 20. By way of these flanges 18, 20, for example, adjoining body-in-white parts or also cladding parts can be connected or fastened to the side sill 12.

The side sill 12 moreover includes, in the longitudinal area 10, a plurality of support walls which delimit respective cavities. In particular, two support walls 22, 24 are provided which extend approximately horizontally and in the transverse direction of the vehicle and which, with a vertical support wall 26 extending in the longitudinal direction of the vehicle and with the inner support wall 16, both delimit an overall approximately rectangular cavity 28. The support walls 16, 22, 24, 26 each extend parallel to each other or at right angles to each other, such that overall a correspondingly constant rectangular cross section of the cavity 28 is obtained over the longitudinal extent of the longitudinal area 10.

Starting from respective corner areas of the generally rectangular cavity 28, respective supporting elements protrude in the form of supporting walls 30 which, in a manner described in more detail below, serve to receive a reinforcing element in the form of a reinforcing tube 32.

Figure 2A:
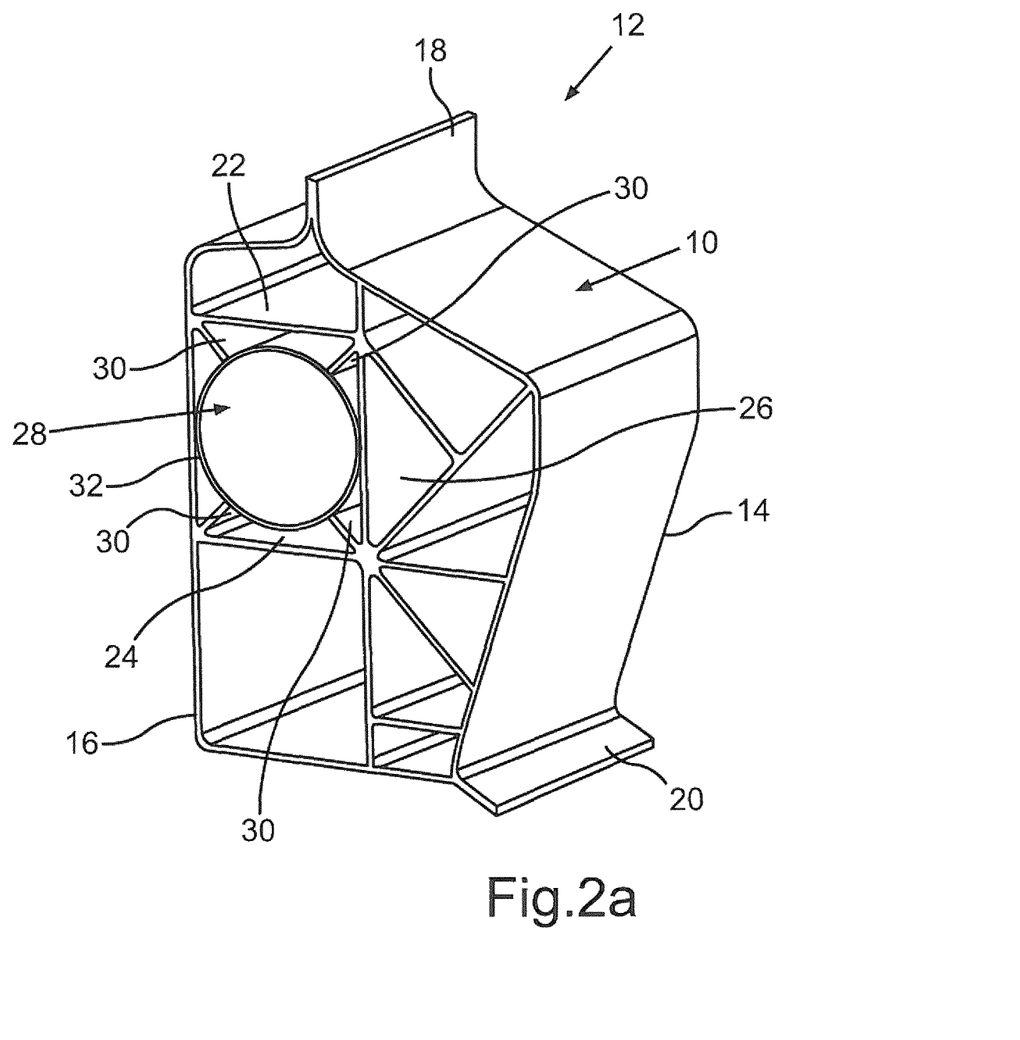
FIGS. 2a and 2b show a perspective sectional view and a sectioned front view, respectively, of the support according to FIG. 1, with a reinforcing tube which is received inside the corresponding cavity and which is held with form-fit engagement via respective supporting walls in the transverse direction or height direction of the support and is held with force-fit engagement in the longitudinal direction of the support.
Figure 2B:
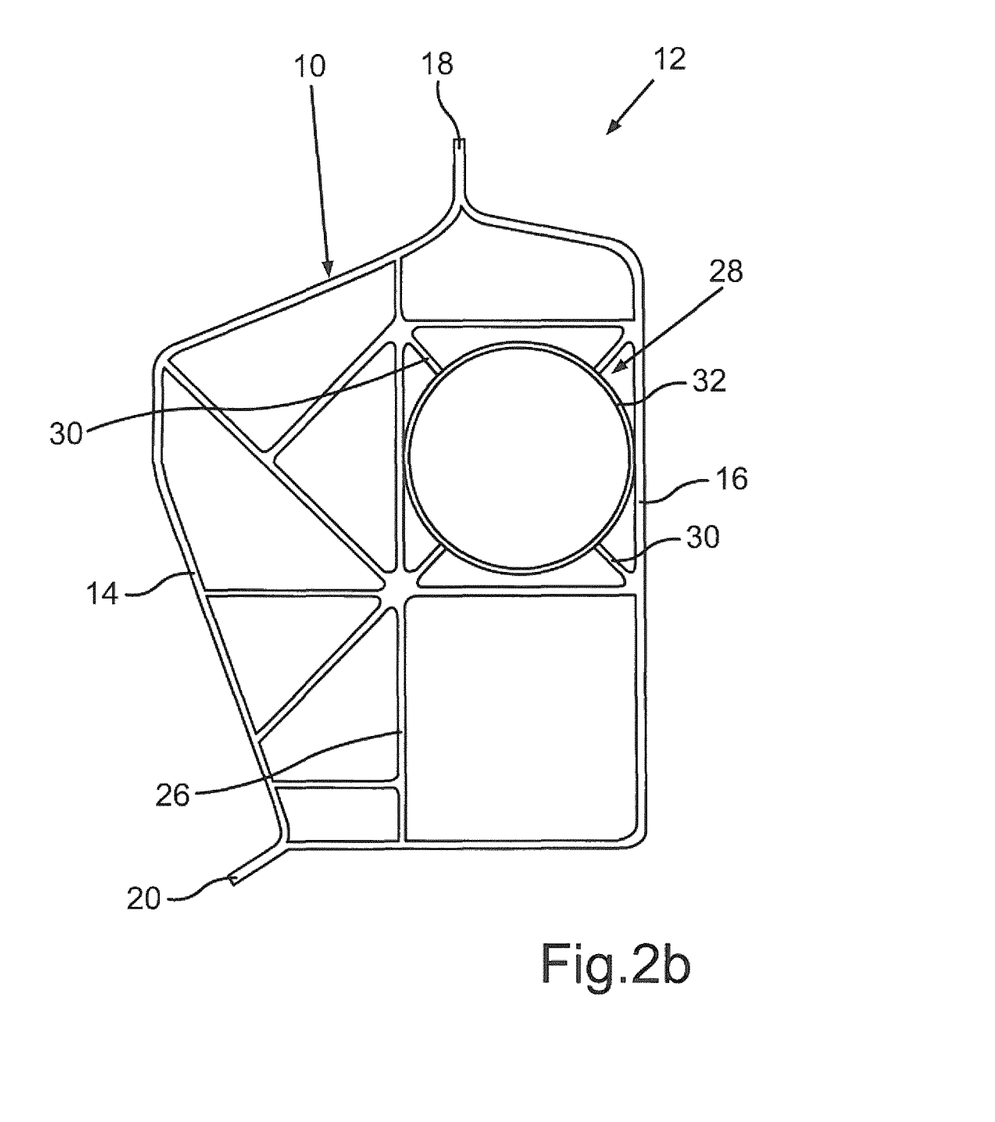

The joining of the reinforcing tube 32 to the side sill 12 is depicted in a perspective view in FIG. 2a and in a sectional front view in FIG. 2b, the two views being rotated. It will at any rate be seen here that the respective supporting walls 30 are dimensioned such that the reinforcing tube 32 in the transverse direction and height direction of the side sill 12, i.e. in the transverse direction of the vehicle or in the height direction of the vehicle in the installed state, is held with form-fit engagement inside the cavity 28. In other words, the reinforcing tube 32 cannot therefore move in the transverse direction of the vehicle or in the height direction of the vehicle.

In order now to likewise fasten the reinforcing tube 32 in its position relative to the side sill 12, particularly also in the longitudinal direction of the support, i.e., in the case of the present side sill 12, particularly in the longitudinal direction of the vehicle, it is connected with force-fit engagement to the support 12, more precisely to the respective supporting walls 30. This force-fit connection can be achieved, for example, by the reinforcing tube 32 being suitably overdimensioned in relation to the receptacle formed by the supporting walls 30. The corresponding force-fit connection can be achieved, for example, by corresponding cooling of the reinforcing tube 32 or, conversely, by corresponding heating of the side sill 12. It would of course also be contemplated to press the reinforcing tube 32 into the cavity 28. Particularly in the case of pressing in, provision can also be made that either the receptacle, formed by the supporting walls 30, or the reinforcing tube 32 gently taper in a conical shape in order to make pressing-in easier. At any rate, this results in a force-fit connection between the reinforcing tube 32 and the side sill 12 in the corresponding longitudinal portion 10 such that it is positioned in situ, particularly also in the longitudinal direction of the support, i.e. in the longitudinal direction of the vehicle. In this way, corresponding joining methods for fastening the reinforcing tube 32 in the correct position are not needed.

It will moreover be seen from FIG. 2b that the supporting walls 30 are oriented toward the reinforcing tube 32. In this way, the reinforcing tube 32 is held inside the cavity 28 in a particularly uniform manner in terms of force. The supporting walls 30 can have their final dimension directly after the extrusion in the contact area of the reinforcing tube 32, or they can also be reworked after the extrusion, for example machined by cutting.

The reinforcing tube 32 serves in particular to stiffen and reinforce the side sill 12 in the event of a frontal collision, e.g. with little lateral overlap (offset crash), and in particular avoids corresponding buckling. Thus, a support 12 of generally reduced cross section can be used which is stiffened by the reinforcing tube 32 only at suitably loaded locations which, for example, have a tendency to buckle. Although the present invention is described with reference to the side sill 12, the present integration of the reinforcing tube 32 can also be used in other supports, for example the main longitudinal supports in the area of the front structure or the rear structure, or in the area below the vehicle floor.

Figure 3B:
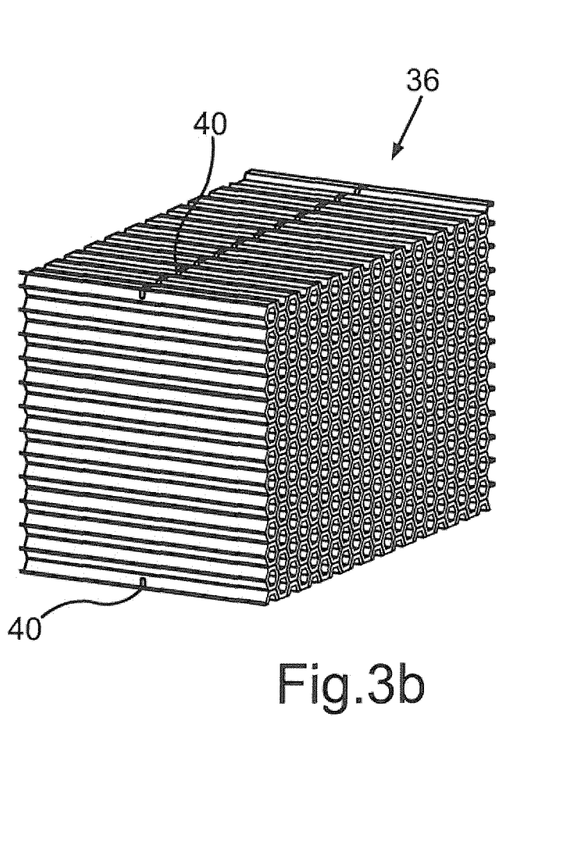
Figure 4:
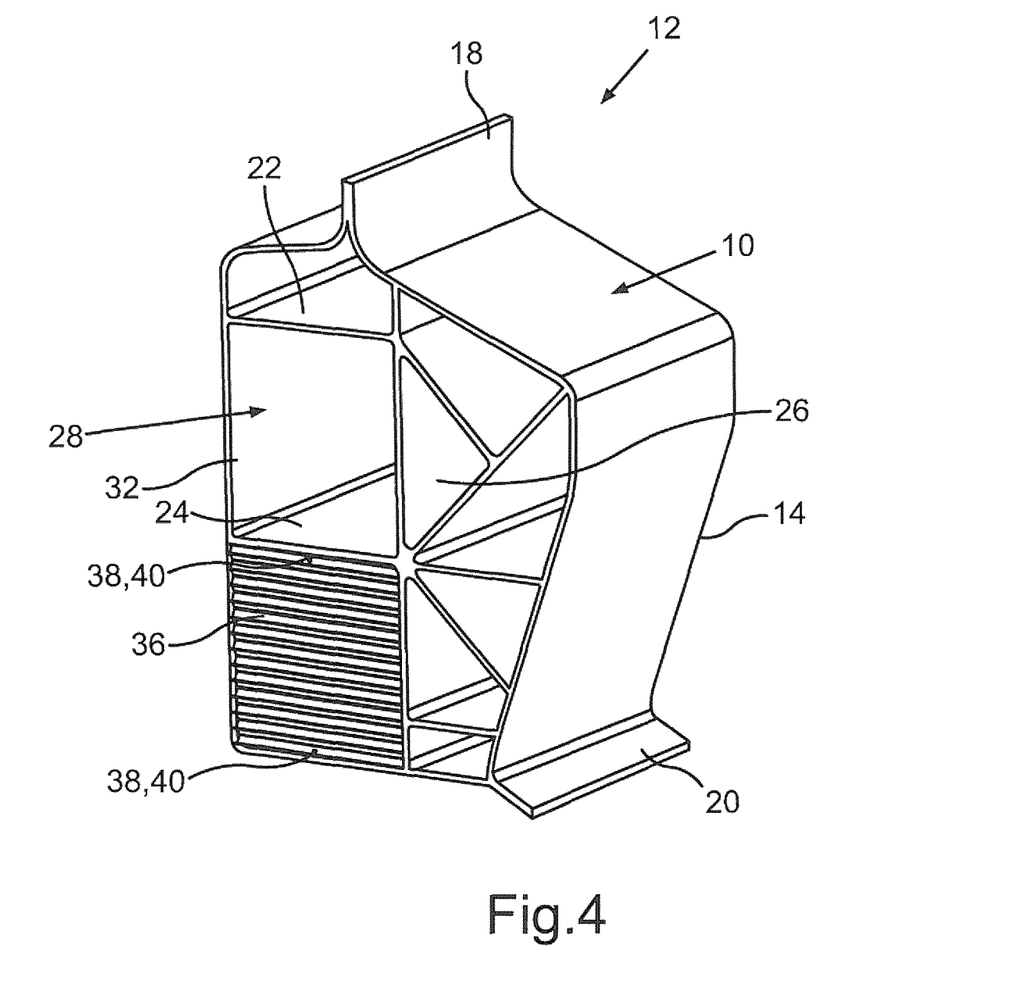
FIG. 4 is a perspective view of a detail of the longitudinal area of the support analogous to FIG. 2a, wherein the honeycomb structure according to FIG. 3b is here integrated in the corresponding cavity.

FIG. 4 shows, analogously to FIG. 2a, a further embodiment of the side sill 12 which, in its longitudinal portion 10, is designed analogously to the embodiment according to FIGS. 1 to 2b. Here, the support walls 16, 24, 26 delimit a lower inner cavity 34 which is arranged under the upper cavity 28 and inside of which a reinforcing element in the form of a reinforcing structure 36 is received. This reinforcing structure 36 is here designed as a honeycomb structure, which is designed according to the perspective view in FIG. 3b. The reinforcing structure 36 can be formed, for example, from a metal alloy or a plastic.

Figure 3A:
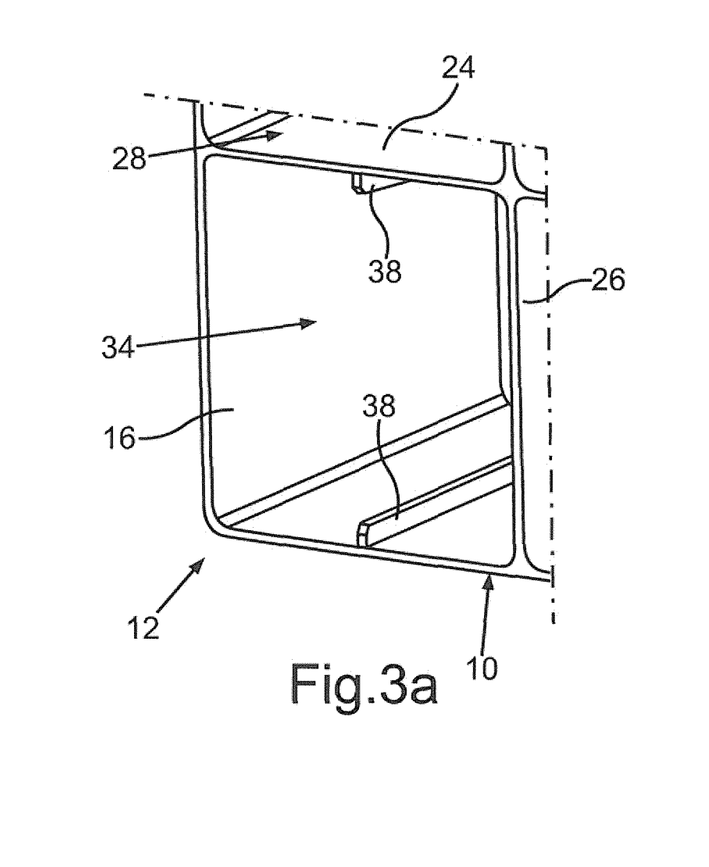
FIGS. 3a and 3b each show schematic and perspective views of details of a cavity and a reinforcing element for integration in this cavity according to a further embodiment in which the reinforcing element is designed as a reinforcing structure in the form of a honeycomb structure, wherein respective guide elements are provided on sides of the cavity and of the honeycomb structure, by which the honeycomb structure can be pushed in a guided manner into the corresponding cavity.

As will also be seen from FIG. 3a, which depicts the longitudinal area 10 of the side sill 12 in the area of the lower cavity 34, the side sill 12 has, on the support walls 16 and 24, corresponding guide elements 38. In the present case, the guide elements 38 are designed as slats or the like extending in the longitudinal direction of the support. These slats 38 cooperate with respective guide elements of the reinforcing structure 36 in the form of grooves 40 which, in a negative form with respect to the slats 38, extend on the upper face and lower face of the reinforcing structure 36. As will be seen from FIG. 4, the respective guide elements 38 in the form of slats and the respective guide elements 40 in the form of grooves cooperate on sides of the side sill 12 and of the reinforcing structure 36 in such a way that, when the reinforcing structure 36 is pushed into the cavity 34, suitable guiding is obtained which, for example, makes it impossible for the reinforcing structure 36 to become jammed inside the cavity 34. A particularly accurate positioning of the reinforcing structure 36 inside the cavity 28 is thus achieved.

The force-fit connection between the reinforcing structure 36 and the respective support walls 14, 24, 26 is, in the present case, achieved, for example, by the reinforcing structure 36 being pressed into the cavity 34. Here, the reinforcing structure 36 and/or the cavity 34 can have a gently conical profile. It is also contemplated to produce the force-fit connection by heating the reinforcing structure 36 and/or the side sill 12. At any rate, however, a corresponding overdimension of the reinforcing structure 36 in relation to the cavity 34 is once again intended to generate the force-fit connection which makes movement of the reinforcing structure 36 in the longitudinal direction of the support impossible. In order to produce the force-fit connection, the side sill 12 can in this case be suitably widened elastically or elasto-plastically.

Figure 5A:
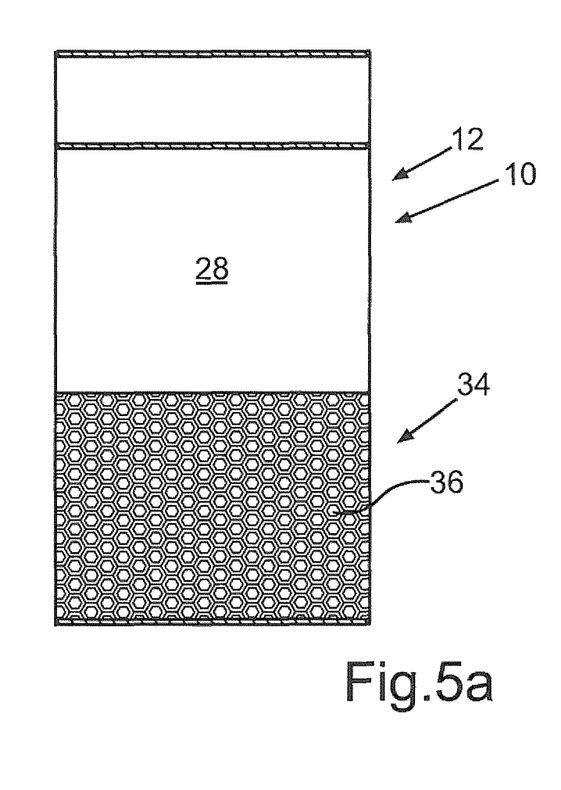
FIGS. 5a and 5b show a sectional view in the longitudinal direction and in the transverse direction, respectively, through the support according to FIGS. 3a to 4, with the honeycomb structure integrated in the corresponding cavity.
Figure 5B:
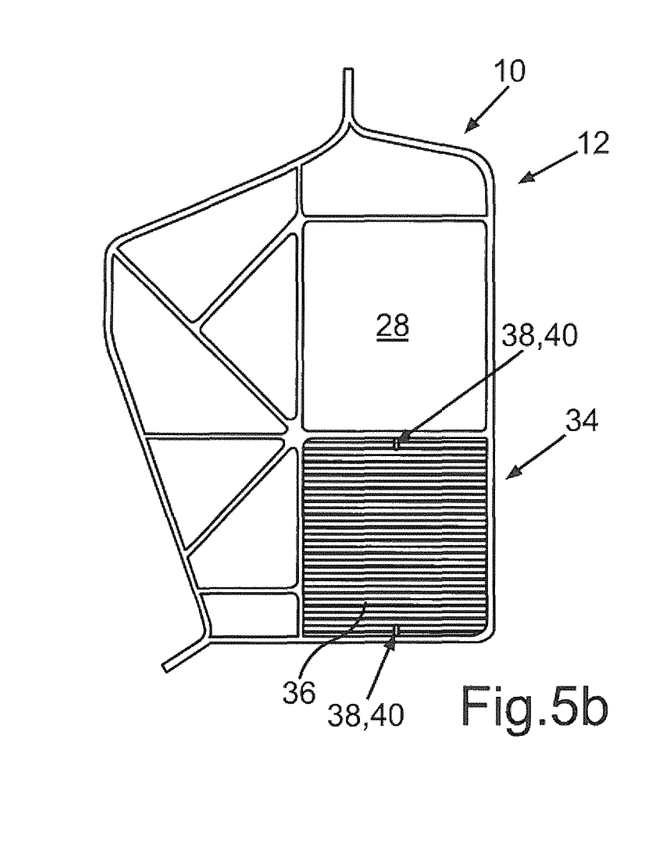

As will finally be seen from FIGS. 5a and 5b, which show a longitudinal section and a cross section, respectively, of the longitudinal area 10 of the side sill 12, the respective cavities of the reinforcing structure 36 extend in the transverse direction of the support, i.e. in the present case in the transverse direction of the vehicle and approximately horizontally. This results in particularly high energy absorption in the event of a side impact against the side sill 12.

The two embodiments according to FIGS. 1 to 2b and FIGS. 3a to 5b, respectively, can also be combined with each other, such that a reinforcing tube 32 is integrated in the cavity 28 and also a reinforcing structure 36 is integrated in the cavity 34.

LIST OF REFERENCE SIGNS 10 longitudinal portion
12 support/side sill
14 outer support wall
16 inner support wall
18 upper flange
20 outer lower flange
22 support wall
24 support wall
26 support wall
28 cavity
30 supporting walls
32 reinforcing element/reinforcing tube
34 cavity
36 reinforcing element/reinforcing structure
38 guide elements/slats
40 guide elements/grooves The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A support for a motor vehicle body-in-white, comprising:
   a straight longitudinal portion of the support that includes at least one cavity which is delimited by walls of the support;
   a reinforcing element received and secured in the straight longitudinal portion of the support in the at least one cavity; and
   a plurality of supporting walls, wherein each of the plurality of supporting walls protrudes at a respective corner of the at least one cavity from a respective joining between the walls of the support and extends from the walls at an angle to the walls, wherein the reinforcing element is held in the at least one cavity by a force-fit engagement with the plurality of supporting walls.

2. The support according to claim 1, wherein the support is an extruded profile.

3. The support according to claim 2, wherein the extruded profile is formed of an aluminum alloy or of fiber reinforced plastic.

4. The support according to claim 1, wherein the support is configured as a side sill of a vehicle.

5. The support according to claim 1, wherein the reinforcing element is configured as a reinforcing tube.

6. The support according to claim 1, wherein the plurality of supporting walls extend in a direction of a central axis of the reinforcing tube.

7. The support according to claim 1, wherein the reinforcing element is configured as a honeycomb structure.

8. The support according to claim 4, wherein the reinforcing element is configured as a honeycomb structure.

9. The support according to claim 7, wherein respective cavities of the honeycomb structure extend in a transverse direction of the support.

10. The support according to claim 1, further comprising:
guide elements provided on the walls of the support, wherein
the guide elements cooperate with corresponding guide elements of the reinforcing element such that the reinforcing element is movable in a longitudinal direction of the support into the cavity via the cooperating guide elements.

11. A method of reinforcing a support for a motor vehicle body-in-white, the method comprising the acts of:
providing a support with a straight longitudinal portion that includes at least one cavity delimited by walls of the support;
providing a reinforcing element configured to be received inside the cavity; and
force-fit engaging the reinforcing element in a longitudinal direction of the support in the cavity so as connect the reinforcing element to the support, wherein the force-fit engaging is between the reinforcing element and a plurality of supporting walls of the support, wherein each of the plurality of supporting walls protrudes at a respective corner of the at least one cavity from a respective joining between the walls of the support and extends from the walls at an angle to the walls.

12. The method according to claim 10, wherein the act of providing the support further comprises extruding the support from an aluminum alloy or fiber reinforced plastic material.

13. The method according to claim. 11, wherein the act of providing the reinforcing element comprises the act of forming the reinforcing element as a reinforcing tube.

14. The method according to claim 11, wherein the act of force-fit engaging of the reinforcing element further comprises the act of heating and cooling one or both of the reinforcing element or the support prior to engagement.

* * * * *